(12) United States Patent
Olszewski

(10) Patent No.: US 6,823,322 B2
(45) Date of Patent: Nov. 23, 2004

(54) PIECEWISE NONLINEAR MAPPER FOR DIGITALS

(75) Inventor: Kim Joseph Olszewski, Carlsbad, CA (US)

(73) Assignee: Denso Corporation, Kariya (JP)

( * ) Notice: Subject to any disclaimer, the term of this patent is extended or adjusted under 35 U.S.C. 154(b) by 469 days.

(21) Appl. No.: 10/077,028

(22) Filed: Feb. 14, 2002

(65) Prior Publication Data

US 2002/0136319 A1 Sep. 26, 2002

Related U.S. Application Data

(60) Provisional application No. 60/269,235, filed on Feb. 14, 2001.

(51) Int. Cl.[7] ................................................ G06E 1/00
(52) U.S. Cl. .......................................................... 706/17
(58) Field of Search ............................................ 706/17

(56) References Cited

U.S. PATENT DOCUMENTS 5,913,826 A * 6/1999 Blank ........................ 600/500

6,493,386 B1 * 12/2002 Vetro et al. .................. 375/240

OTHER PUBLICATIONS

Davoli et al, "A Two-Level Stochastic Approximation for Admission Control and Bandwidth Allocation" IEEE Journal on Selected Areas in Communication, Feb. 2000.*

* cited by examiner

Primary Examiner—George B. Davis
(74) Attorney, Agent, or Firm—Harness, Dickey & Pierce, PLC

(57) ABSTRACT

A nonlinear signal mapper that can implement any continuous one-to-one nonlinear map of baseband or intermediate-frequency digital signals. The mapping method follows a "divide-and-conquer" approach in that a nonlinear map to be implemented is piecewise decomposed into a set of simpler nonlinear component maps. The component maps are implemented using code-enabled feed-forward neural networks (FF-NNs). Each code-enabled feed-forward neural network only operates on samples of a digital input signal that lie in a specified interval of the real-valued number line. Code-enabled FF-NNs are controlled by codewords produced by a scalar quantization encoder. The quantization encoder also controls a multiplexer that directs values produced by the FF-NNs to the nonlinear mapper's output.

13 Claims, 3 Drawing Sheets

PIECEWISE NONLINEAR MAPPER FOR DIGITALS

CROSS-REFERENCE TO RELATED APPLICATIONS

This application claims benefit of U.S. Provisional application No. 60/269,235, filed Feb. 14, 2001, the content of which is herein incorporated by reference in its entirety.

TECHNICAL FIELD

This invention relates to signal mappers, and more particularly to continuous one-to-one nonlinear mapping of digital signals.

BACKGROUND

A signal mapper is an apparatus that operates on an input signal x and outputs a signal y according to a functional map $f: x \rightarrow y$. A signal mapper is linear if signal $x_1$ produces signal $y_1$, signal $x_2$ produces signal $y_2$, and $ax_1+bx_2$ produces $ay_1+by_2$ for all constant pairs (a,b) and input pairs $(x_1,x_2)$. Any signal mapper which violates this property is called a nonlinear mapper.

Nonlinear mappers can be employed to implement numerous digital signal processing tasks within communications systems. Power control procedures between base stations and mobile terminals within a cellular network may be based on estimated signal-to-interference plus noise power ratios (SINR). SINR estimates can be mapped to their logarithmic representation by a nonlinear mapper. The logarithmic map stabilizes the variance of an estimated SINR signal and thereby helps improve power control performance and stability. A benefit of improved power control is an increase in cellular network capacity. Automatic gain control (AGC) is another signal processing task that typically employs a nonlinear mapper. For AGC a nonlinear logarithmic mapper maps a many-decade dynamic range input signal to an output signal with a relatively narrow dynamic range, an AGC loop requirement. Source coding is another digital signal processing task that may require a nonlinear mapper. A non-uniform quantizer for source coding can be implemented by first passing a digital signal through a type of nonlinear mapper called a compander. The compander compresses the signal's amplitude range which is subsequently uniformly quantized. The above digital signal processing tasks and many others such as signal enhancement, noise and interference mitigation, nonlinear pre-emphasis and de-emphasis, cryptography, digital watermarking, square roots, inverse tangents for phase, etc., may employ nonlinear mappings. Methods which implement nonlinear maps in a computationally and power efficient manner are a necessity in current and future communications systems.

Two methods for implementing nonlinear maps for digital signal processing tasks within communications systems are commonly used in prior art. The first method involves storing desired nonlinear map output values in a random-access-memory (RAM) look-up table, one for every possible mapper input value. This method allows a nonlinear mapper output value to be computed quickly if the look-up table is small and is practical for nonlinear maps requiring limited precision and having mapper input and output values within a small domain. However, for many nonlinear maps this method is impractical because it requires too great a RAM to store the look-up table, especially if the nonlinear mapper is implemented on an integrated circuit chip where chip area is a limited resource. The second method for computing a nonlinear map involves implementing a power series expansion to approximate a desired nonlinear map. Although the power series method allows a nonlinear map value to be computed with high precision, it requires a large number of numeric operations to attain high precision and therefore a longer period of time to execute. This negatively affects the time-critical throughput of a digital signal processing task within a communications systems.

A need exists for a nonlinear mapper that can quickly and accurately perform nonlinear maps of digital signals and can be implemented using minimal hardware and power consumption. Additionally, the nonlinear mapper should have the capability to be reconfigured instantaneously allowing a single nonlinear mapper to be utilized for numerous nonlinear maps that may be required in a communications system.

SUMMARY

The present invention provides a nonlinear mapper that can implement any continuous one-to-one nonlinear map of baseband or intermediate-frequency digital signals. The mapping method follows a "divide-and-conquer" approach in that a nonlinear map to be implemented is piecewise decomposed into a set of simpler nonlinear component maps. The component maps are implemented using code-enabled feed-forward neural networks (FF-NNs). Each code-enabled feed-forward neural network only operates on samples of a digital input signal that lie in a specified interval of the real-valued number line. Code-enabled FF-NNs are controlled by codewords produced by a scalar quantization encoder. The quantization encoder also controls a multiplexer that directs values produced by the FF-NNs to the nonlinear mapper's output.

Each code-enabled FF-NN implements a component nonlinear map of a piecewise decomposition as a weighted linear summation of sigmoidal basis functions. The FF-NN apparatus implements the summation in a parallel architecture thereby allowing a nonlinear map to be performed quickly. The apparatus to implement each basis function in the summation employs a simple RAM look-up table. Smoothness properties, symmetry and ordinate ranges of sigmoidal functions allow the basis functions to be implemented using very small RAM look-up tables. Weights associated with basis functions can be changed instantaneously thereby allowing the nonlinear mapper to be easily and quickly reconfigured for numerous nonlinear maps.

The details of an embodiment of the invention are set forth in the accompanying drawings and description below. Other features, objects, and advantages of the invention will be apparent from the description and drawings, and from the claims.

DESCRIPTION OF DRAWINGS

Studying the invention description concurrently with the invention drawings will facilitate understanding and implementation of the invention. The drawings are for purposes of invention description only and do not limit the scope of the invention in any way.

Like reference symbols in the various drawings indicate like elements.

DETAILED DESCRIPTION

A functional architecture depicts the functional modules of a method or system and how they are integrated. This invention description is organized into functional modules. Invention description in terms of functional modules permits flexibility in the actual hardware or software implementation of the invention.

Figure 1:
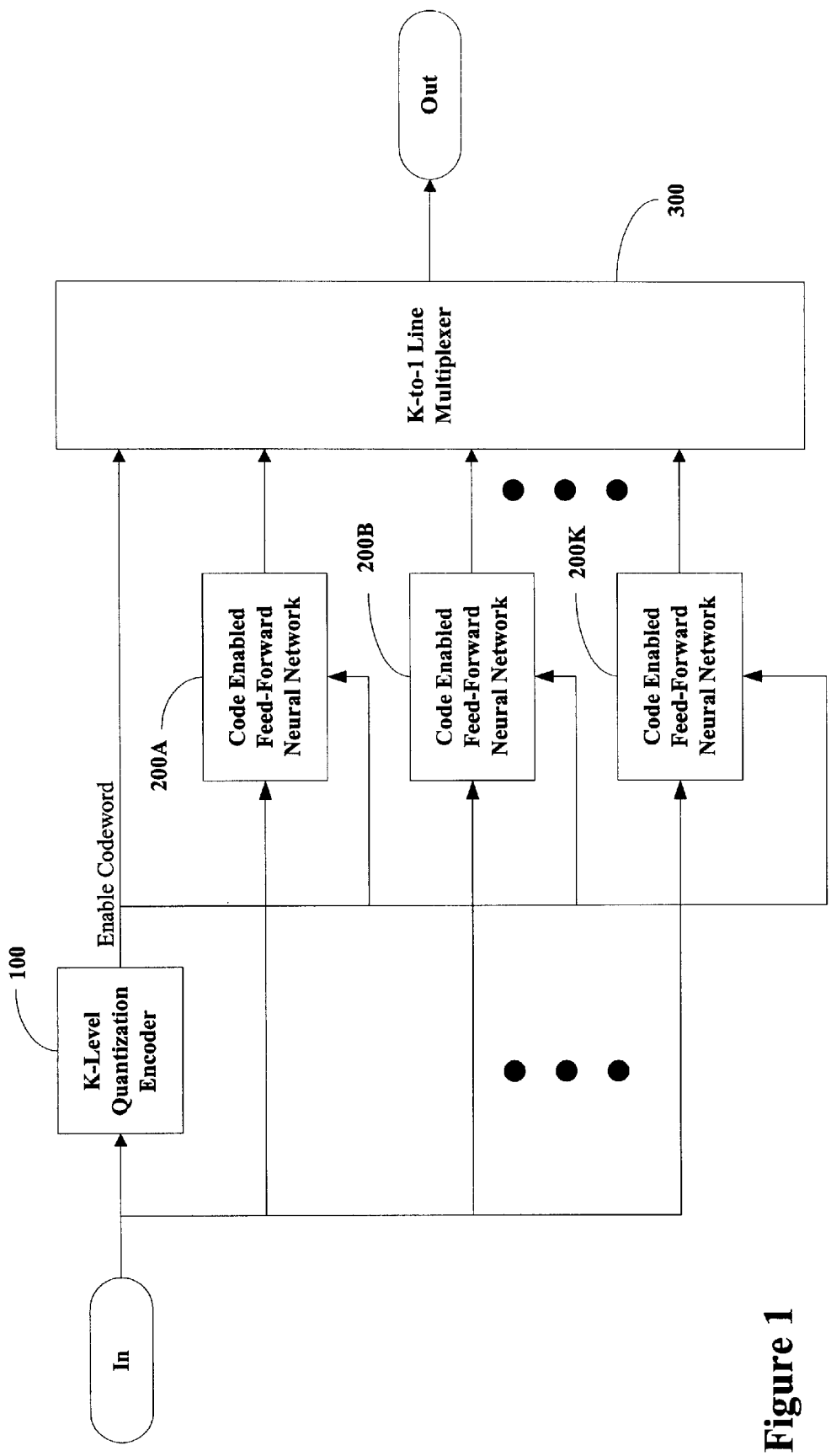
FIG. 1 is a top-level view of the parallel apparatus used to implement piecewise nonlinear maps of digital signals.

FIG. 1 shows a top-level view of the parallel apparatus used to implement piecewise nonlinear maps of digital signals. Components of the apparatus are a K-level uniform or nonlinear scalar quantization encoder 100, a plurality of K code-enabled feed-forward neural networks 200A,200B, . . . ,200K, and a K-to-1 line multiplexer 300.

Let integer m denote the sample number of a discrete-time signal. The apparatus operates on a discrete-time deterministic or random input signal $\{x_m\}_{m=0}^{\infty}$. Samples of the apparatus input signal are within a known open interval (a,b). Let integer K be greater than 1. Real-valued numbers a and b are endpoints of a partition $$a=P_1<P_2<\ldots <P_K<P_{(K+1)}=b$$

where each partition end-point $P_i$, i=1, . . . ,K+1, is also a real-valued number. K-level quantization encoder 100 quantizes each signal sample $x_m$ within partition interval $[P_i,P_{(i+1)})$, i=1, . . . ,K, to an amplitude level $L_i$ from an amplitude level set L={$L_1$, . . . ,$L_K$}. In the preferred embodiment the number of amplitude levels in L is K=$2^B$ where B≧1 is a positive integer. For each quantized signal sample $x_m$, quantization encoder 100 outputs a unique FF-NN enable codeword $c(L_i)$ from a codebook $$C=\{c(L_i), i=1, \ldots, K\}$$

Each codeword $c(L_i)$ output by quantization encoder 100 is selected by using $L_i$ as an index into codebook C. As an example, if K=4 the K-level quantization encoder 100 might be described by the following logic:

if $x_m$ is in $[P_1,P_2)$ quantize $x_m$ to $L_1$ output $c(L_1)$=00 else if $x_m$ is in $[P_2,P_3)$ quantize $x_m$ to $L_2$ output $c(L_2)$=01 else if $x_m$ is in $[P_3,P_4)$ quantize $x_m$ to $L_3$ output $c(L_3)$=10 else $x_m$ is in $[P_4,P_5)$ quantize $x_m$ to $L_4$ output $c(L_4)$=11

The invention allows the quantization encoder 100 to be implemented as a digital comparator structure or a feedforward neural network. A neural network implementation has the advantage of being better able to cope with a noisy input signal $\{x_m\}_{m=0}^{\infty}$.

Figure 2:
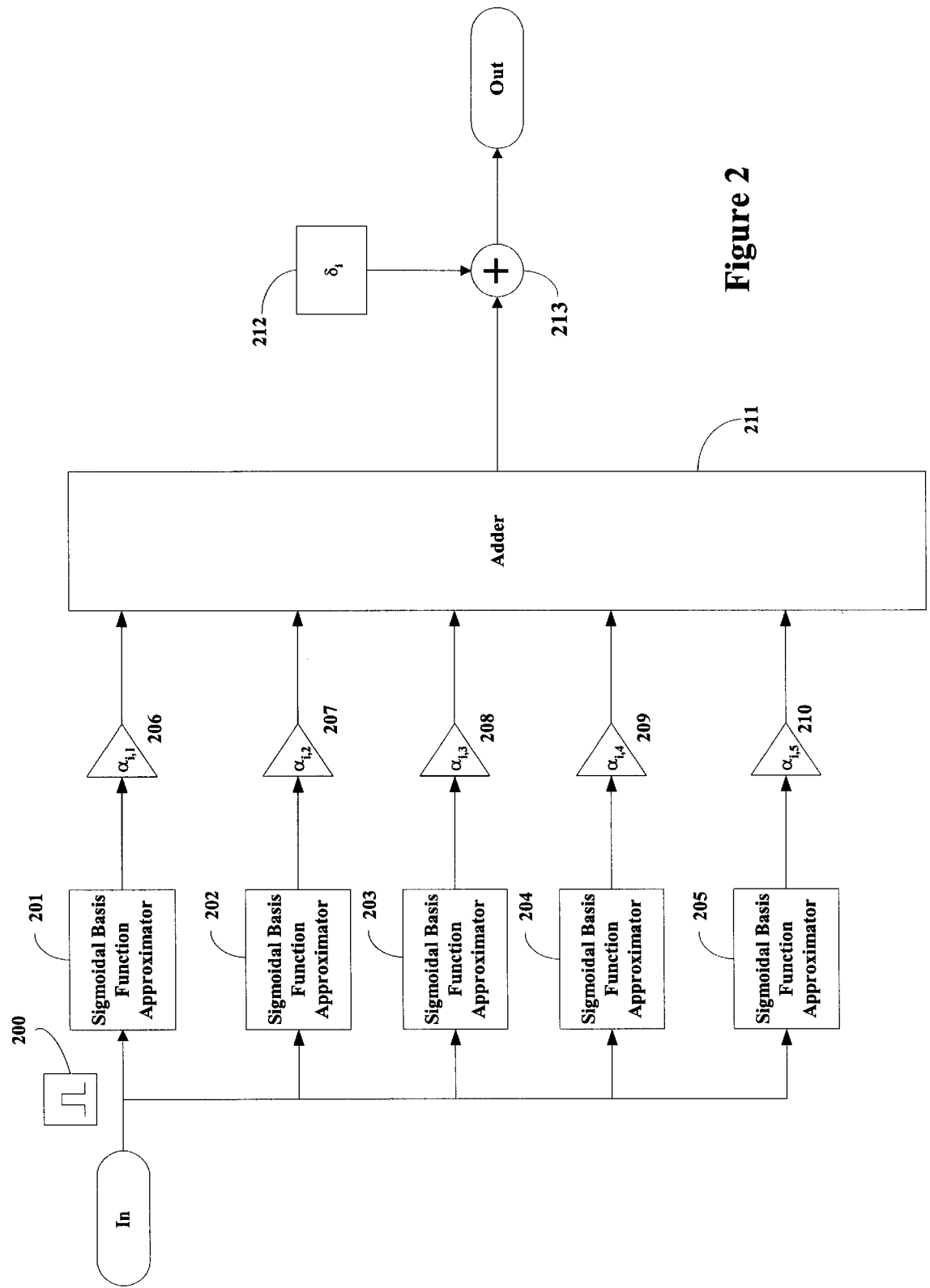
FIG. 2 is a block diagram of one of the code enabled feed-forward neural networks (FF-NNs).

FIG. 2 shows an exemplary apparatus to implement the ith code-enabled FF-NN in 200A, 200B, . . . , 200K of FIG. 1. Referring to FIG. 2 it is seen that the exemplary apparatus for the ith FF-NN is comprised of a plurality of sigmoidal basis function approximators (201, 202, . . . , 205), a plurality of basis function weights (206, 207, . . . , 210), an adder 211, a bias weight 212, another adder 213 and enable circuitry 200. The ith FF-NN only processes samples of input signal $\{x_m\}_{m=0}^{\infty}$ within a specified partition interval $[P_i,P_{i+1})$, i=1, . . . ,K. The ith code-enabled FF-NN is assigned its own unique codeword $c(L_i)$ from codebook C. The enable circuitry 200 controls its operation. The enable circuitry reads all enable codewords output by quantization encoder 100. For each enable codeword read the enable circuitry makes a decision. If a codeword other than its own is read, the enable circuitry commands the ith FF-NN to remain idle or in a sleep state, its output is disabled. If the enable circuitry reads its own enable codeword, indicating that a sample $x_m$ is in partition interval $[P_i,P_{i+1})$, the enable circuitry commands the ith FF-NN to output a nonlinear map value $$f_i(x_m, w_i) = \sum_{j=1}^{N_i} \alpha_{i,j}\sigma_{i,j}(\beta_{i,j}x_m + \psi_{i,j}) + \delta_i$$

Each basis function $\sigma_{i,j}$ in the above equation is a continuous sigmoidal function multiplied by a real-valued basis function weight $\alpha_{i,j}$. An example of a continuous sigmoidal function is the hyperbolic tangent function $$\sigma(x) = \tanh(x) = \frac{e^x - e^{-x}}{e^x + e^{-x}}$$

Other well-known continuous sigmoidal functions are the logistic sigmoid and the Gaussian sigmoid. Note that the invention allows for different combinations of sigmoidal basis functions to compute the above nonlinear map value.

The exemplary ith FF-NN apparatus of FIG. 2 only employs five sigmoidal basis functions to implement a nonlinear component map $f_i(x_m,w_i)$ for partition interval $[P_i,P_{i+1})$. The invention allows as many sigmoidal basis functions as desired to implement $f_i(x_m,w_i)$. Variable parameters for $f_i(x_m,w_i)$ above are (1) $N_i$≧1 an integer used to specify the number of sigmoidal basis functions, and (2) learned basis function parameters which include real-valued length $N_i$-vectors $$\alpha_i=[\alpha_{i,1}\ \alpha_{i,2}\ \ldots\ \alpha_{i,N_i}]^T$$

$$\beta_i=[\beta_{i,1}\ \beta_{i,2}\ \ldots\ \beta_{i,N_i}]^T$$

$$\psi_i=[\psi_{i,1}\ \psi_{i,2}\ \ldots\ \psi_{i,N_i}]^T$$

and $\delta_i$ a real-valued scalar. Superscript T in the above vector equations denotes vector transpose. If input signal $\{x_m\}_{m=0}^{\infty}$ is random partition intervals $[P_i,P_{i+1})$, with a higher probability of occurrence should be parameterized with FF-NNs that are more accurate. Parameterization and partitioning for the invention apparatus can be better optimized when the probability density function of a random input signal $\{x_m\}_{m=0}^{\infty}$ is known.

Figure 3:
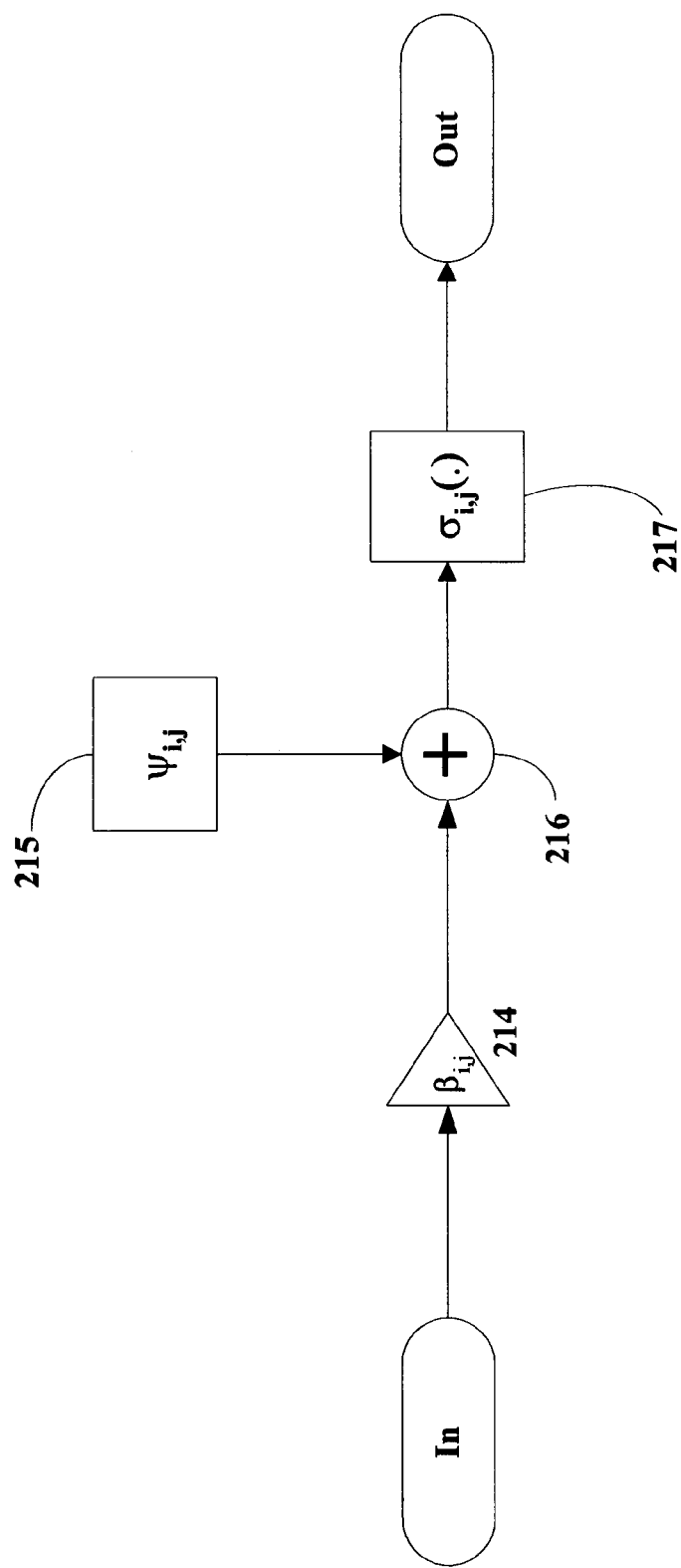
FIG. 3 is block diagram of a basis function approximator for an FF-NN.

FIG. 3 shows the apparatus for implementing one of the sigmoidal basis function approximators in FIG. 2. Gain 214 multiplies input signal sample $x_m$ by a real-valued multiplicative parameter $\beta_{i,j}$ to produce $\beta_{i,j}x_m$. Register 215 stores real-valued parameter $\psi_{i,j}$ which is added to $\beta_{i,j}x_m$ by adder 216 to form a sigmoidal basis function argument $\beta_{i,j}x_m+\psi_{i,j}$. Sigmoidal basis function $\sigma_{i,j}$ is implemented using look-up table 217. The look-up table is indexed by argument $\beta_{i,j}x_m+\psi_{i,j}$. The size of the look-up table is dependent on the type of sigmoidal basis function chosen and the accuracy required. Smoothness, symmetry and ordinate ranges of sigmoidal functions allow for look-up tables with very small memory requirements.

To estimate parameter vectors $\alpha_i$, $\beta_i$ and $\psi_i$ and scalar $\delta_i$ for the ith FF-NN the finite length-$M_i$ learning signals $$\{x_{i,m}^{LRN}\}_{m=1}^{M_i} \text{ and } \{y_{i,m}^{LRN}\}_{m=1}^{M_i}$$

are required. Samples of the learning signals are comprised of known $f_i(x_m,w_i)$ input values $\{x_{i,m}^{LRN}\}_{m=0}^{M_i}$ and corresponding output values $\{y_{i,m}^{LRN}\}_{m=0}^{M_i}$. The real-valued length $3N_i+1$ vector $$w_i=[\alpha_i^T\ \beta_i^T\ \psi_i^T\ \delta_i]^T$$

contains all the parameters required to define a desired component nonlinear map $f_i(x_m,w_i)$ for partition interval $[P_i,P_{i+1})$. The optimum $w_i$ for $f_i(x_m,w_i)$ can be computed off-line by minimizing the summation of squares cost function $$\frac{1}{M_i}\sum_{m=1}^{M_i}(y_{i,m}^{LRN} - f_i(x_{i,m}^{LRN}, w_i))^2$$

over all possible length $3N_i+1$ real-valued vectors $w_i$. The invention allows other cost functions to be used if desired. A nonlinear optimization algorithm such as the Levenberg-Marquardt can be used to accomplish cost function minimization.

Function approximation theory shows that a parameterized nonlinear map $f_i(x_m,w_i)$ for partition interval $[P_i,P_{i+1})$ can approximate any nonlinear continuous one-to-one function. Approximation error is dependent on both the length $M_i$ of the learning signals and the ability of the chosen parameterized structure $f_i(x_m,w_i)$ to model the map associated with $[P_i,P_{i+1})$. The design of $f_i(x_m,w_i)$ should address: (1) the type and number $N_i$ of sigmoidal basis functions, (2) the accuracy of the learning signals used to characterize the desired nonlinear map, and (3) the nonlinear optimization algorithm used and its parameters (iterations, error bound, etc.).

Returning to FIG. 1, K-to-1 line multiplexer 300 is a combinatorial logic circuit that selects one of the K output lines of FF-NNs 200A, 200B, . . . , 200K. Multiplexer 300 directs information on the selected line to the apparatus output. The selection of a particular FF-NNs output line is also controlled by an enable codeword read from the output of quantization encoder 100. The real-valued scalar output $y_m$ of the K-to-1 line multiplexer 300 is described by the piecewise-nonlinear map $$y_m = \begin{cases} f_1(x_m, w_1) & \text{if } x_m \text{ is in } [P_1, P_2) \\ f_2(x_m, w_2) & \text{if } x_m \text{ is in } [P_2, P_3) \\ \vdots & \vdots \\ f_K(x_m, w_K) & \text{if } x_m \text{ is in } [P_K, P_{K+1}) \end{cases}$$

where $f_i(x_m,w_i))$, i=1, . . . ,K, is the parameterized nonlinear map value for partition interval $[P_i,P_{i+1})$. In accordance with an enable codeword read from the output of the quantization encoder 100, multiplexer 300 selects the appropriate output value from the right-hand-side of the above equation. The above parallel decomposition allows for simple or complicated nonlinear maps to be divided piecewise. Each partition interval $[P_i,P_{i+1})$, i=1, . . . , K, of the piecewise defined map is associated with a dedicated FF-NN implementation of $f_i(x_m,w_i)$. In this manner a "divide-and-conquer" strategy is applied to implement nonlinear maps.

The present invention allows for (1) decreased memory usage due to a piecewise decomposition of a map and simple sigmoidal basis function look up tables, (2) decreased computational complexity due to map representation as a linear combination of basis functions rather than a power series expansion, (3) decreased processing delay due to a parallel apparatus which implements the basis function representation, and (4) easy reconfiguration due to the ability of the apparatus to instantaneously change the nonlinear map by downloading new parameters. This last improvement is especially useful for programmable logic devices such as field-programmable-gate-arrays. In fact, the apparatus allows $f_i(x_m,w_i))$, i=1, . . . , K, for partition $[P_i,P_{i+1})$ to be reconfigured for a different nonlinear map at any time instant. Only parameters for $f_i(x_m,w_i)$ need to changed, the basis functions can remain the same. Thus a single nonlinear mapper can be utilized to perform many signal processing tasks resulting in decreased costs and signal processor form factor.

A single embodiment of the invention has been described. Nevertheless, it will be understood that various modifications may be made without departing from the spirit and scope of the invention. Accordingly, other embodiments are within the scope of the following claims.

What is claimed is:

1. A method of mapping a signal comprising:
   dividing the signal into a map having a plurality of sections;
   approximating a basis function of each of the plurality of sections;
   implementing a look-up table for each basis function.

2. The method of claim 1, further comprising mapping a nonlinear digital signal.

3. The method of claim 1, further comprising associating each of the plurality of sections with a look-up table.

4. The method of claim 1, further comprising mapping each signal sample within each of the plurality of sections to an amplitude level.

5. The method of claim 1, further comprising defining each basis function as a continuous sigmoidal function.

6. The method of claim 1, further comprising mapping the signal offline.

7. A signal mapper comprising:
   a quantization encoder which receives an input signal and divides the input signal into a plurality of segments;
   a plurality of neural networks which receive a corresponding one of the plurality of segments and maps the corresponding segment; and
   a multiplexer which selects one of the plurality of neural networks.

8. The signal mapper of claim 7, wherein the plurality of neural network are code enabled, feed forward neural networks.

9. The signal mapper of claim 7, wherein each of the plurality of neural networks approximates a basis function for the corresponding segment.

10. The signal mapper of claim 9, wherein each basis function is defined as a continuous sigmoidal function.

11. The signal mapper of claim 9, wherein a look-up table is created from each basis function.

12. The signal mapper of claim 11, wherein each look-up table is associated one of the plurality of segments.

13. The signal mapper of claim 7, wherein the input signal is a non-linear signal.

\* \* \* \* \*